United States Patent
York et al.

(10) Patent No.: US 10,618,506 B2
(45) Date of Patent: Apr. 14, 2020

(54) UTILIZATION OF BRAKES AND TRANSMISSION SYSTEM TO AFFECT STEERING OF A VEHICLE AND METHOD THEREOF

(71) Applicant: Allison Transmission, Inc., Indianapolis, IN (US)

(72) Inventors: Michael York, Carmel, IN (US); Bruce E. Crum, Brownsburg, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 70 days.

(21) Appl. No.: 15/813,593

(22) Filed: Nov. 15, 2017

(65) Prior Publication Data
US 2018/0148026 A1   May 31, 2018

Related U.S. Application Data

(60) Provisional application No. 62/426,790, filed on Nov. 28, 2016.

(51) Int. Cl.
*B60T 8/32* (2006.01)
*B62D 11/00* (2006.01)
(Continued)

(52) U.S. Cl.
CPC ............ *B60T 8/3215* (2013.01); *B60T 8/172* (2013.01); *B60T 8/1755* (2013.01); *B60T 8/58* (2013.01);
(Continued)

(58) Field of Classification Search
CPC ...... B60T 8/3215; B60T 8/172; B60T 8/1755; B60T 8/58; B60T 2260/04; B62D 11/003;
(Continued)

(56) References Cited

U.S. PATENT DOCUMENTS 3,107,554 A    10/1963  Polak
4,702,358 A *  10/1987  Mueller ................. B62D 11/08
                                                        180/6.7
(Continued)

FOREIGN PATENT DOCUMENTS

EP       0231160 A2    8/1987
JP     S57 201771 A   12/1982
JP      S60 22561 A    2/1985

OTHER PUBLICATIONS

European Search Report, European Patent Office, pp. 1-8, dated May 24, 2018.
(Continued)

*Primary Examiner* — Pamela Rodriguez
(74) *Attorney, Agent, or Firm* — Taft Stettinius & Hollister LLP; Stephen F. Rost

(57) ABSTRACT

A method of controlling a vehicle during a braking operation includes providing a first and a second brake actuator, a brake input device, a steer input device, and a cross-drive transmission having two outputs and a controller. The method includes detecting a first output speed at the first output and a second output speed at the second output, and receiving a brake input request and a steer input request. The method also includes determining a differential output speed based on the first output speed and the second output speed, and comparing the differential output speed to a first threshold, the brake input request to a second threshold, and the steer input request to a third threshold. The method includes determining the first or the second output is locked during the braking operation, and controlling the first or the second brake actuator based on which output is determined to be locked.

8 Claims, 11 Drawing Sheets

(51) Int. Cl.
  *B62D 11/10* (2006.01)
  *B60T 8/172* (2006.01)
  *B62D 11/08* (2006.01)
  *B60T 8/58* (2006.01)
  *B60T 8/1755* (2006.01)

(52) U.S. Cl.
  CPC ............ *B62D 11/003* (2013.01); *B62D 11/08* (2013.01); *B62D 11/10* (2013.01); *B60T 2260/04* (2013.01)

(58) Field of Classification Search
  CPC ....... B62D 11/10; B62D 11/08; F16D 65/853; F16D 2065/787
  See application file for complete search history.

(56) References Cited

U.S. PATENT DOCUMENTS

| 6,527,070 | B2* | 3/2003 | Ryan | ...................... | B62D 11/08 180/6.2 |
| 7,690,734 | B2* | 4/2010 | Oehme | ................ | B60T 13/686 180/6.3 |
| 2018/0274614 | A1* | 9/2018 | Crum | ...................... | B60T 8/172 |

OTHER PUBLICATIONS

European Office Action, European Patent Office, European Patent Application No. 17203328.4, dated Jun. 13, 2019, 4 pages.

\* cited by examiner

UTILIZATION OF BRAKES AND TRANSMISSION SYSTEM TO AFFECT STEERING OF A VEHICLE AND METHOD THEREOF

RELATED APPLICATIONS

This application claims the benefit of U.S. Provisional Patent Application Ser. No. 62/426,790, filed Nov. 28, 2016, the disclosure of which is hereby expressly incorporated by reference in its entirety.

FIELD OF THE DISCLOSURE

The present disclosure relates to a method of controlling a transmission system, and in particular to a method of controlling a transmission system to affect braking and steering capabilities of a vehicle.

BACKGROUND

In a conventional vehicle or work machine, a transmission system transfers torque from an engine or prime mover to a ground-engaging mechanism such as a wheel or track. In a tracked vehicle, for example, a transmission may transfer torque to the tracks to allow the vehicle or machine to move in a forward or reverse direction. The transmission may include an independent braking and steering system that affect vehicle performance. If an operator wants to steer the vehicle or machine through a tight turn, the transmission system may include a pivot steer system to do so. With independent brake and steer systems, the vehicle is unable to utilize both systems simultaneously to improve vehicle stability, steering response, and general vehicle performance. This is particularly true with cross-drive transmissions used in commercial, agricultural, and military applications. Thus, there is a need to improve steer response, vehicle stability, and the like via an automated control system that utilizes a brake actuation system.

SUMMARY

In one embodiment of the present disclosure, a method of controlling a vehicle moving in a direction of travel during a braking operation includes providing a first brake actuator, a second brake actuator, a brake input device, a steer input device, and a cross-drive transmission including a first output, a second output, and a controller; detecting a first output speed at the first output and a second output speed at the second output; receiving a brake input request and a steer input request at the controller, the brake input request received from the brake input device and the steer input request received from the steer input device; determining a differential output speed based on the first output speed and the second output speed; comparing the differential output speed to a first threshold, the brake input request to a second threshold, and the steer input request to a third threshold; determining based on the comparing step the first output or the second output is locked during the braking operation; controlling the first brake actuator or the second brake actuator based on which output is determined to be locked; and controlling the vehicle during the braking operation.

In a first example of this embodiment, the method includes reducing a brake load or pressure applied to the locked output. In a second example, the method includes discontinuing the reducing step once the locked output is unlocked. In a third example, the controlling steps of this embodiment may be executed if the differential output speed is greater than the first threshold; the brake input request is greater than the second threshold; and the steer input request is less than the third threshold. In a fourth example, the method includes maintaining movement of the vehicle along the direction of travel during the braking event. In a fifth example, the method may include preventing the vehicle from rotating relative to the direction of travel. In a sixth example, the method may include providing a first speed sensor, a second speed sensor, a brake input sensor, and a steer input sensor; and detecting the first output speed with the first speed sensor, the second output speed with the second speed sensor, the brake input request with the brake input sensor, and the steer input request with the steer input sensor. In a seventh example, the method may include storing a look-up table in the controller; and executing command logic stored in the controller based on the look-up table to actuate the first brake actuator or the second brake actuator based on which output is determined to be locked.

In another embodiment of this disclosure, a method of improving steer response of a vehicle during a combined braking and steering operation includes providing a first brake actuator, a second brake actuator, a brake input device, a steer input device, and a cross-drive transmission including a first output, a second output, and a controller; detecting a first output speed at the first output and a second output speed at the second output; receiving at the controller a steer input request from the steer input device; determining a differential output speed based on the first output speed and the second output speed; comparing the differential output speed to a first threshold and the steer input request to a second threshold; controlling by the controller the first brake actuator or the second brake actuator to reduce the first output speed or the second output speed as a function of the steer input request; and improving steer response of the vehicle during the combined braking and steering operation.

In one example of this embodiment, the method may include determining a magnitude of the steer input request. In a second example, the comparing step may include comparing the magnitude of the steer input request to the second threshold. In a third example, the method may include determining from a look-up table stored in the controller how much to control brake pressure from the first brake actuator or the second brake actuator as a function of the steer input request. In a fourth example, the method may include determining from the steer input request an instruction to steer the vehicle in a desired direction; and reducing the output speed of the first or second output based on the steer input request so that during the steering operation the output speed of whichever of the first or second output is on an inside of the desired steer direction is less than the output speed of the other output speed.

In a further embodiment of this disclosure, a method of controlling a vehicle during a pivot steer operation includes providing a first brake actuator, a second brake actuator, a brake input device, a steer input device, a throttle input device, a range input device for selecting between a plurality of ranges including a pivot range, and a cross-drive transmission including a first output, a second output, and a controller; detecting a first output speed at the first output and a second output speed at the second output; receiving a brake input request, a steer input request, a throttle input request, and a range input request at the controller, the brake input request received from the brake input device, the steer input request received from the steer input device, the throttle input request received from the throttle input device, and the range input request received from the range input device; determining a difference between the first output speed and the second output speed; comparing the difference to a first threshold, the brake input request to a second threshold, the steer input request to a third threshold, the throttle input request to a fourth threshold, and the range input request to a fifth threshold; executing command logic by the controller to reduce the greater of the first or second output speeds until the first output speed is substantially equal to the second output speed; and controlling the vehicle during the pivot steer operation when the range input request corresponds to the pivot range.

In one example of this embodiment, the method may include determining a magnitude of the first output speed and the second output speed. In a second example, the determining step may include determining the difference between the magnitude of the first output speed and the magnitude of the second output speed. In a third example, the controlling step may be executed if the difference is greater than the first threshold; the brake input request is less than the second threshold; the steer input request is greater than the third threshold; the throttle input request is greater than the fourth threshold; and the range input request is in the pivot range. In a fourth example, the method may include determining a magnitude of the steer input request. In a fifth example, the method may include minimizing a pivot radius of the vehicle during the pivot steer operation.

In yet a further embodiment of the present disclosure, a method of controlling a vehicle during a steering event includes providing a first brake actuator, a second brake actuator, a brake input device, a steer input device, and a cross-drive transmission including a first output, a second output, and a controller; detecting a first output speed at the first output and a second output speed at the second output; receiving at the controller a steer input request from the steer input device; determining a differential output speed based on the first output speed and the second output speed; comparing the differential output speed to a first threshold; controlling the first brake actuator or the second brake actuator by the controller to reduce the first output speed or the second output speed as a function of the steer input request; and controlling the vehicle during the steering operation.

In one example of this embodiment, the method may include providing a primary steering system of the vehicle; detecting a problem with the primary steering system; and performing the steering operation only by actuating the first brake actuator or the second brake actuator. In a second example, the controlling steps are executed if the differential output speed is greater than the first threshold. In another example, the method may include storing a look-up table in the controller; determining an amount to actuate either the first or second brake actuator based on the look-up table; and actuating the first brake actuator or the second brake actuator as a function of the steer input request and according to the determined amount from the look-up table.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The terminology used herein is for the purpose of describing particular illustrative embodiments only and is not intended to be limiting. As used herein, the singular forms "a", "an" and "the" may be intended to include the plural forms as well, unless the context clearly indicates otherwise. Similarly, plural forms may have been used to describe particular illustrative embodiments when singular forms would be applicable as well. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
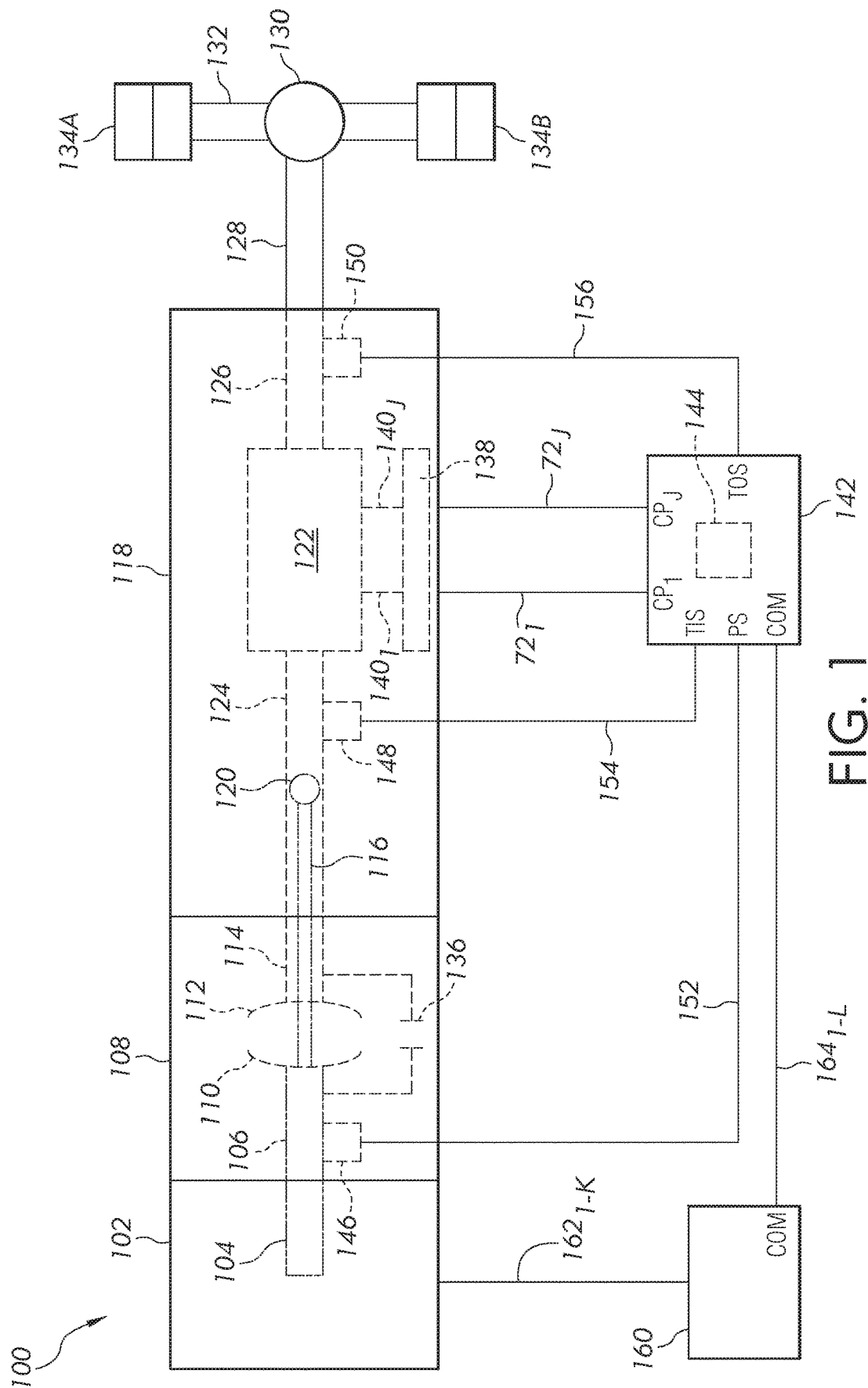
FIG. 1 is a block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when all or certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Referring to FIG. 2, one embodiment of a transmission system 200 is illustrated. The transmission system 200 includes an input 202 and an output 284. Torque may be provided at the input 202 by an engine (not shown), prime mover, or other torque-producing system. In this embodiment, the transmission system 200 includes a first side 286 and a second side 288. As shown, there is an output 284 at each side. The output 284 represents the transmission output in this embodiment. Output torque from the transmission output 284 may be delivered to a final drive assembly or other system to drive a ground-engaging mechanism such as a wheel or track.

The transmission system 200 may include an input shaft 204 which receives torque from the engine (not shown). A speed sensor 206 may be provided to detect or measure input speed based on the rotation of the input shaft 204. Alternatively, input speed (or engine speed) may be communicated to a transmission controller 310 (FIG. 3) via a J-1939 communication link or any other known means. Input speed and other characteristics, such as input torque, may be communicated to the transmission controller 310 from an engine controller 302 according to known methods.

The transmission system 200 may include a fluid coupling device such as a torque converter 208. The torque converter 208 may include a pump and a turbine. Moreover, a lockup clutch 210 may be provided as will be described in further detail.

Torque passing through the torque converter 208 drives a turbine shaft 212, as shown. The turbine shaft 212 is coupled between the torque converter 208 and a bevel gearset 214. The bevel gearset 214 may include a drive gear 216, a first driven gear 218 and a second driven gear 220. The drive gear 216 may be directly connected to the turbine shaft 212, and each driven gear may be coupled to a directional clutch.

In FIG. 2, the transmission system 200 includes a first directional clutch 226 and a second directional clutch 228. The first directional clutch 226 may be selectively engaged to allow the transmission output 284 to rotate in a forward direction or a reverse direction. The second directional clutch 228 may be selectively engaged to allow the transmission output 284 to rotate in a direction opposite of when the first directional clutch 226 is selectively engaged. Moreover, the directional clutches allow range clutch packs and a hydrostatic steer unit (HSU) 240 to be driven in either direction. Other directional clutches may be provided besides the ones depicted in FIG. 2. Moreover, if the transmission system is in a neutral position or range, one of the directional clutches may be selectively engaged. In other words, in one example, at least one of the directional clutches may be engaged in each selected position or range. In another example, however, there may be at least one position or range whereby neither or none of the directional clutches are selectively engaged.

For purposes of this disclosure, a selected position or range may include any gear ratio, speed ratio, position on a shift selector, or combination thereof. A shift selector may include a park position, a reverse position, a forward position, a neutral position, and a pivot position. The forward position may include a "low" and a "high" position. This may vary depending upon the type of vehicle or machine and its intended use. A four-wheel drive vehicle, for example, may include a "four-wheel drive" position and a "two-wheel drive" position. Thus, this disclosure is not intended to be limiting as it relates to any known type of position on a shift selector or range or ratio attainable by a transmission.

A first shaft 222 may be coupled between the first driven gear 218 and the first directional clutch 226. A second shaft 224 may be coupled between the second driven gear 220 and the second directional clutch 228. In other embodiments, a hub or gear may directly couple each driven gear to the directional clutch. The transmission controller 310 may selectively control the engagement or disengagement of the directional clutches. Other control means, such as the shift selector 304, for selectively engaging or disengaging the directional clutch is also possible. In any event, when the first directional clutch 226 is engaged, torque may transfer from the drive gear 216 to the first directional clutch 226 via the first driven gear 218 and first shaft 222.

The output of each directional clutch is coupled to a range input gearset 230. The range input gearset 230 may include one or more gears. In FIG. 2, the range input gearset 230 includes a first range gear 232, a second range gear 234, and a third range gear 236. The first range gear 232 may be directly coupled to the output of whichever directional clutch is engaged. Thus, torque passes through the engaged directional clutch to the first range gear 232, which is connected to the second range gear 234. The second range gear 234 is coupled to the third range gear 236, which is coupled to an input of the HSU 240. The input of the HSU 240 drives a pump 242, and the pump 242 drives a motor 244 which functions as an output of the HSU 240.

A speed sensor 238 is also shown in FIG. 2. The speed sensor 238 can measure the rotational speed at a location downstream or after the directional clutches. Here, the speed sensor 238 can measure a rotational speed from the second range gear 234 so that both speed and direction are detectable. Thus, the speed sensor 238 may detect both rotational speed and direction in at least one embodiment. In this disclosure, the speed detected by the speed sensor 238 may be referred to as turbine speed.

The transmission system 200 may also include a direct drive pivot clutch 246. The direct drive pivot clutch 246 may be selectively engaged to allow the transmission system 200 to operate in a pivot mode. This is further described in FIG. 4. The direct drive pivot clutch 246 may normally be disengaged so that torque is transferred directly from the engaged directional clutch to the HSU 240. However, when the direct drive pivot clutch 246 is engaged, torque may transfer from the selectively engaged directional clutch through the direct drive pivot clutch 246 to a steer drive geartrain 254. The steer drive geartrain 254 may include the range input gearset 230, a first direct drive gear 250, a second direct drive gear 252, a steer transfer shaft 256, and a steer planetary gearset 258.

When the direct drive pivot clutch 246 is engaged, torque may pass from the selectively engaged directional clutch through the direct drive pivot clutch 246 to rotationally drive a direct drive shaft 248. The direct drive shaft 248 may be coupled to the first direct drive gear 250 and the second direct drive gear 252. The steer transfer shaft 256 may be coupled to the second direct drive gear 252 so that torque splits to the first side 286 and the second side 288 of the transmission system 200. When the direct drive pivot clutch 246 is disengaged, torque may be received from the HSU 240 and split via the steer transfer shaft 256 to both sides of the transmission system 200.

The steer planetary gearset 258 may include a sun gear 260, a carrier member or assembly 262, and a ring gear 264. As shown, the ring gear 264 may be connected to a housing of the transmission system 200 and thus is fixed from rotation. Input to the planetary gearset 258 is via the sun gear 260, and output is via the carrier member 262. The HSU 240 may be connected to the sun gear 260 under normal circumstances, and it is only disconnected when the HSU disconnect mechanism 266 is selectively controlled to its disengaged position or state. Thus, when the HSU disconnect mechanism 266 is engaged, torque may transfer from the HSU 240 into the steer planetary gearset 258 via the sun gear 260 and output via the carrier member 262. The carrier member 262 may be coupled to a steer gear 270, which in turn is coupled to the steer transfer shaft 256. Moreover, torque from the carrier member 262 may also be transferred to a second steer gear 268 which is coupled to an output planetary gearset 272.

When the HSU disconnect mechanism 266 is selectively controlled to its disengaged position, i.e., during a direct drive pivot or pivot lockup mode, torque is not transferred via the HSU 240. Instead, the direct drive pivot clutch 246 is engaged, as described above, and torque passes through the steer planetary gearset 258 via the carrier member 262. In other words, there is no torque passing to the sun gear 260. The carrier member 262 is coupled to a sun gear 274 of the output planetary gearset 272 via the second steer gear 268.

The output planetary gearset 272 may include the sun gear 274, a carrier assembly or member 276, and a ring gear 278. Here, the sun gear 274 is the input of the output planetary gearset 272, and the carrier member 276 is the output of the gearset. The ring gear 278 may be coupled to a shaft 282 which may be splined to another gear or gearset (not shown). The carrier member 276 may be held or fixed from rotation by a brake 280, as shown in FIG. 2B.

The carrier member 276 is coupled to a transmission output shaft. There may be one or more output shafts. In one example, the carrier member 276 on the first side 286 is coupled to one output shaft, and the carrier member 276 on the second side 288 is coupled to a second output shaft. In any event, the one or more output shafts may be coupled, either directly or indirectly, to the transmission output 284.

When steering the vehicle or machine and operating the transmission system 200 in range (e.g., in a forward or reverse direction), torque is transferred through the HSU 240. However, the HSU 240 incurs losses when torque passes therethrough. The same is true with the torque converter 208. These losses reduce the overall efficiency of the transmission system 200. When an operator wants to pivot the vehicle or machine, e.g., to make a 90° turn, it is desirable to reduce the losses of the torque converter 208 and HSU 240 and directly connect engine or input power to the steer drive geartrain 254. In addition, it is desirable to pivot the vehicle or machine without overheating the transmission system 200. To achieve high efficiency and avoid overheating the transmission system 200 during a pivot operation, it is desirable to provide a high efficiency pivot steer system. This may be achieved in at least one embodiment by disconnecting the HSU 240 and engaging lockup clutch 210.

Figure 3:
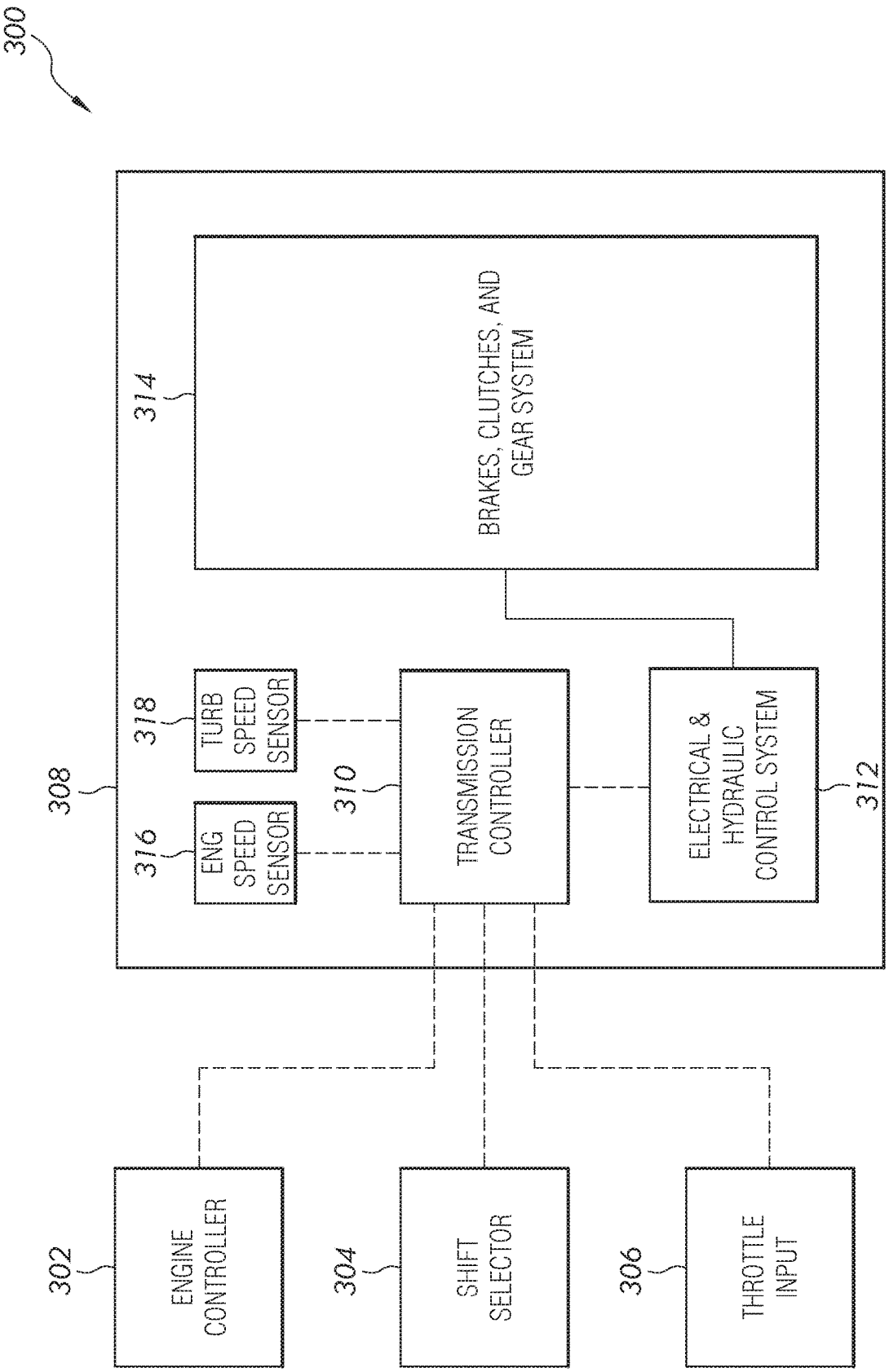
FIG. 3 is a diagram of a controls system of the transmission system of FIG. 2.

Referring to FIG. 3, a vehicular controls system 300 is shown in FIG. 3. In this system 300, a vehicle or machine may include an engine or prime mover (not shown) that is operably controlled by an engine controller 302. An operator can selectively control the vehicle or machine by a shift selector 304 and a throttle input 306. The throttle input 306 may be a sensor that detects when an operator depresses an accelerator or throttle pedal. The sensor may communicate an electrical signal indicative of the amount of throttle desired by the operator. Other control mechanisms may be used by an operator to indicate a desired throttle input. Moreover, other control mechanisms including a brake system, steering system, and the like may further be included in the controls system 300.

As previously described, the shift selector 304 may be controlled by the operator to control steering, pivot and direction of travel of the vehicle or machine. The shift selector 304 may include a plurality of positions such as forward, reverse, neutral and pivot. Other positions may include park, high, low, etc. The shift selector 304 may include a sensor that detects movement of the shift selector to each of its plurality of positions.

The vehicular controls system 300 further includes a transmission system 308, which may be similar to the transmission system 200 of FIG. 2. The transmission system 308 may include a transmission controller 310, a control system 312 such as a valve body with valves, solenoids, and other control elements, and a geartrain 314. The transmission controller 310 may be in electrical communication with the sensors that detect movement or changes to the shift selector 304 and throttle input 306. In FIG. 3, the dashed line represents an electrical connection (wired or wireless) and the solid line represents a hydraulic, mechanical or electro-hydraulic connection. The transmission controller 310 may be in electrical communication with the engine controller 302 for receiving or communicating various commands or instructions. In one example, engine speed may be communicated via the engine controller 302 to the transmission controller 310 over a J-1939 communication link.

The control system 312 of FIG. 3 may include a plurality of electrical and hydraulic control mechanisms such as solenoids, valves, sensors, etc. The control system 312 may be similar to the electro-hydraulic system 138 of FIG. 1. In at least one embodiment, the control system 312 may include a valve body with a plurality of fluid paths defined therein.

Referring to FIG. 3, sensors such as an input or engine speed sensor 316 and a turbine speed sensor 318 may also be included. The engine speed sensor 316 of FIG. 3 may correspond with the speed sensor 206 of FIG. 2, and the turbine speed sensor 318 may correspond with the other speed sensor 238 referenced in FIG. 2. The input speed sensor 316 and turbine speed sensor 318 may be in electrical communication with the transmission controller 310, as shown. Other sensors may be included in the transmission system 308 such as an output speed sensor, input torque sensor, output torque sensor, etc.

The geartrain 314 may include a plurality of friction devices, clutches, brakes, gears, shafts, etc. The plurality of friction devices may include, but are not limited to, one or more conventional brake devices, one or more torque transmitting devices, and the like. Similar to FIG. 1, the operation, i.e., engagement and disengagement, of the plurality of friction devices is controlled by selectively controlling the friction applied by each of the plurality of friction devices, such as by controlling fluid pressure to each of the friction devices. In one example, which is not intended to be limiting in any way, the plurality of friction devices include a plurality of brake and torque transmitting devices in the form of conventional clutches that may each be controllably engaged and disengaged via fluid pressure supplied by the control system 312.

In a further example, the steer drive geartrain 254 may be part of the geartrain 314. In addition, the bevel gearset 214, the first directional clutch 226, the second directional clutch 228, and the direct drive pivot clutch 246 may be included in the geartrain 314. In a further example, the HSU disconnect mechanism 266 may be included in the geartrain 314. Moreover, the steer planetary gearset 258 and output planetary gearset 272 may be included as part of the geartrain 314. In at least one embodiment, each gear, shaft, clutch, brake, and planetary gearset forms part of the geartrain 314 of FIG. 3.

Figure 2A:
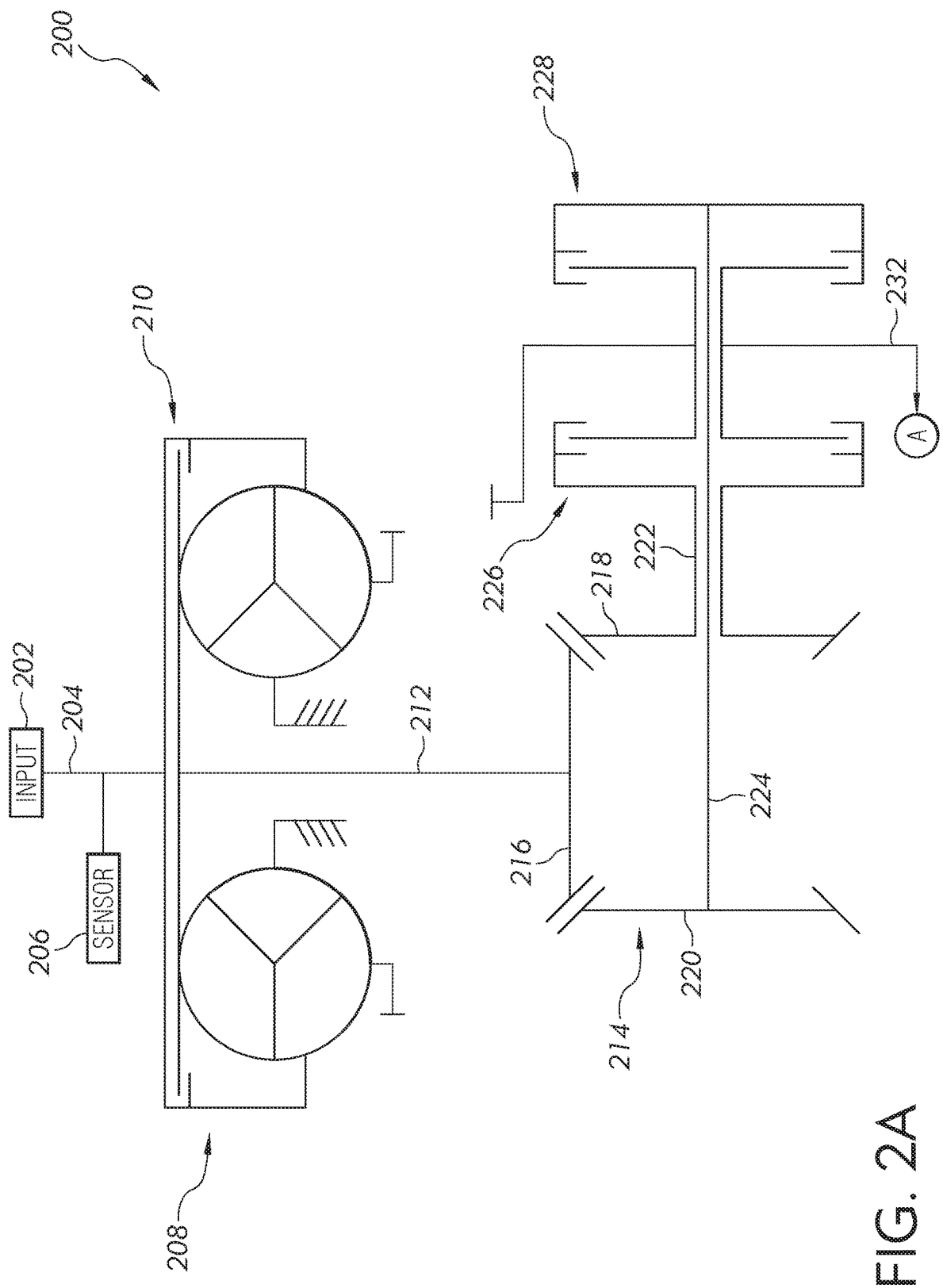
FIG. 2A is a first partial schematic view of a transmission system including a pivot steer system.
Figure 2B:
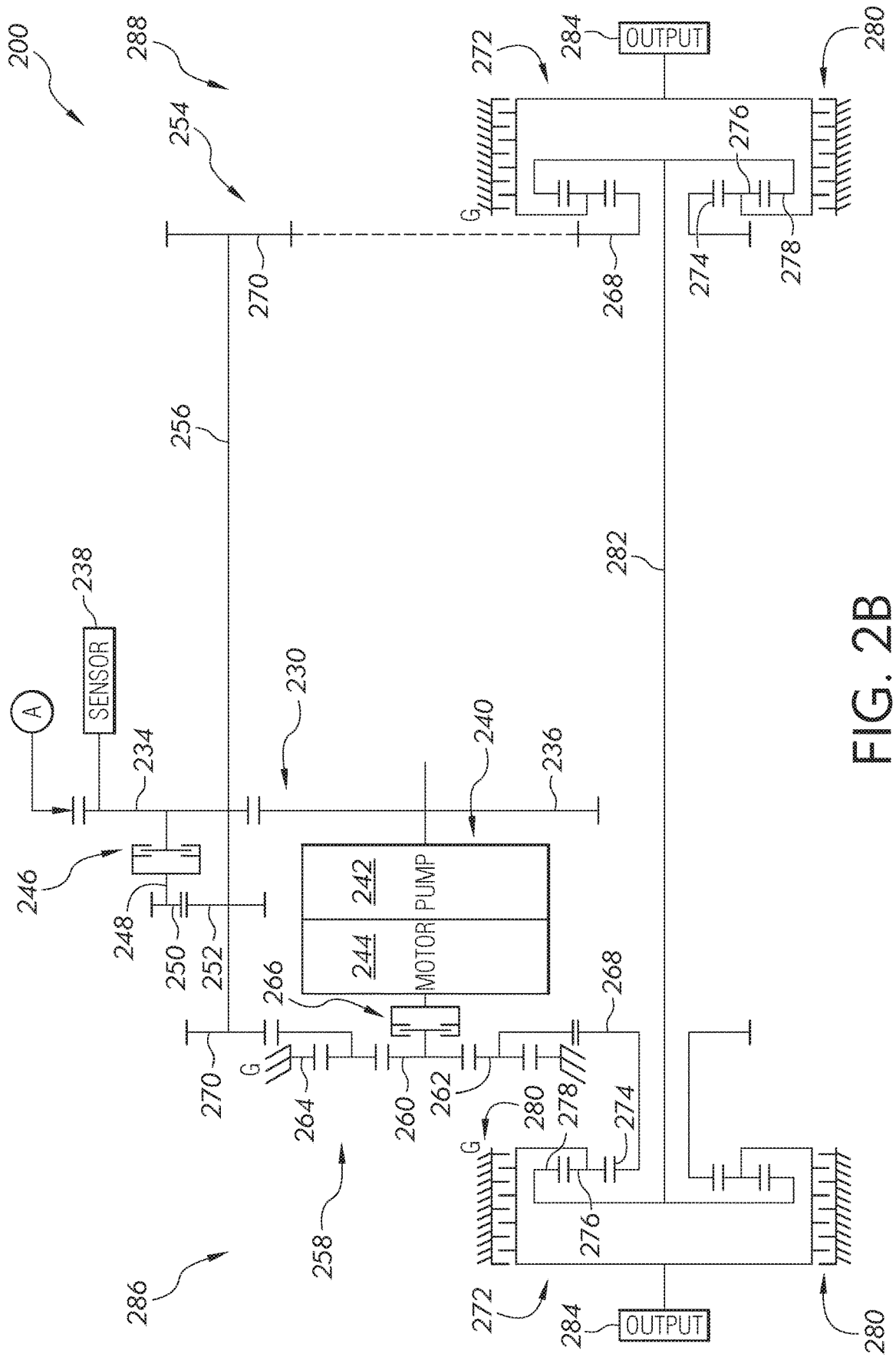
FIG. 2B is a second partial schematic view of the transmission system of FIG. 2A including a pivot steer system.

As previously described, conventional cross-drive transmissions similar to the one depicted in FIGS. 2A-B include independently controlled braking and steering systems. In other words, both systems operate independent of the other and there is little to no overlap therebetween. A conventional braking system may include electromechanical actuators for rotating shafts on the transmission outputs for engaging the brake system. When an operator actuates a brake pedal, for example, the conventional braking system equally applies the brakes on each transmission output.

In the present disclosure, however, electronic controls and actuators may be used in combination with a system controller to improve performance by enhancing stability control, improving steering response, improved pivot steer radius regulation, and an improved backup steer system. These benefits and improvements may be achieved by integrating the braking and steering systems so that each works with the other to improve overall performance. Other benefits and improvements will be achieved via the various embodiments described herein.

Figure 4:
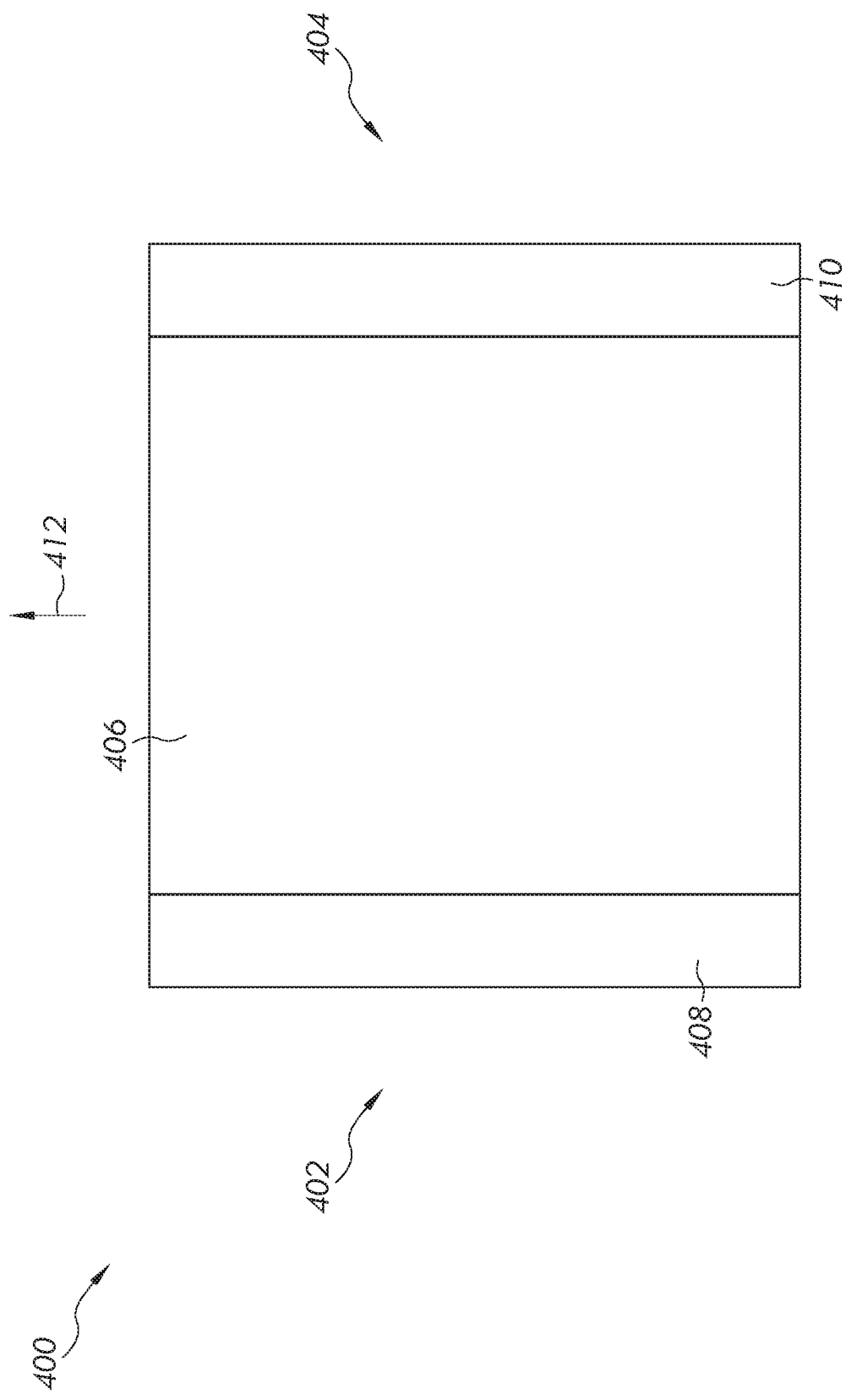
FIG. 4 is a schematic of a vehicle with a first track and a second track.

Referring to FIG. 4, an example of a vehicle or work machine 400 is shown. In this example, the vehicle or work machine 400 includes a first side 402 and a second side 404 (e.g., a left side and a right side). A track may be disposed on each side. As such, the vehicle or work machine 400 may include a first track 408 on the first side 402 and a second track 410 on a second side 404 thereof. The tracked vehicle or work machine 400 includes a body or frame 406 to which the tracks may be coupled (indirectly). During operation, the vehicle or work machine 400 may travel in a forward direction indicated by arrow 412. The vehicle or work machine 400 may travel in a reverse direction, which is opposite arrow 412. Moreover, the vehicle or work machine 400 may steer in a first direction (i.e., towards the first side 402) or a second direction (i.e., towards the second side 404). Further, the vehicle or work machine 400 may pivot relative to a point located on the vehicle or work machine 400, and the pivotal movement may be defined by a radius of pivot.

In one embodiment of this disclosure, a cross-drive transmission may be provided with independently controlled brake actuation on each output. A controls provision may be further included to regulate unrequested yaw during a braking event. In FIG. 4, if the second track 410 locks or skids during a braking event while the first track 408 does not, a system is provided for modulating brake pressure on the second side 404 of the vehicle 400 to recover traction of the second track 410. In other words, brake pressure may be reduced on the second side 404 of the vehicle 400 to maintain the vehicle's current direction of travel 412. As such, rotation of the vehicle 400 relative to a requested steer path 412 may be minimized. This is particularly the case when the operator does not command a steer response (e.g., a command to steer the vehicle 400 in either direction).

In a conventional system, uneven torques on both sides of the vehicle 400 would cause the vehicle to pivot or rotate about a point. In this embodiment of the disclosure, however, a control system 500 includes a controller 504 for controlling a cross-drive transmission 502 is provided. The controller 504 may include a memory and a processor. Logic, algorithms, look-up tables, charts, graphs, and other electronic instructions may be stored in the memory of the controller 504 for executing various commands to control the transmission 502, steering and braking of the vehicle.

The transmission 502 may include a plurality of inputs 506 and at least a first output 508 and a second output 510. The first output 508 may drive the first track 408 and the second output 510 may drive the second track 410 of the illustrated vehicle 400 of FIG. 4. A first speed sensor or sensing device 512 may detect rotational output speed of the first output 508, and a second speed sensor or sensing device 514 may detect rotational output speed of the second output 510. As shown, the first and second speed sensors may be in electrical communication with the controller 504 to communicate the rotational speed of each output to the controller 504.

Figure 5:
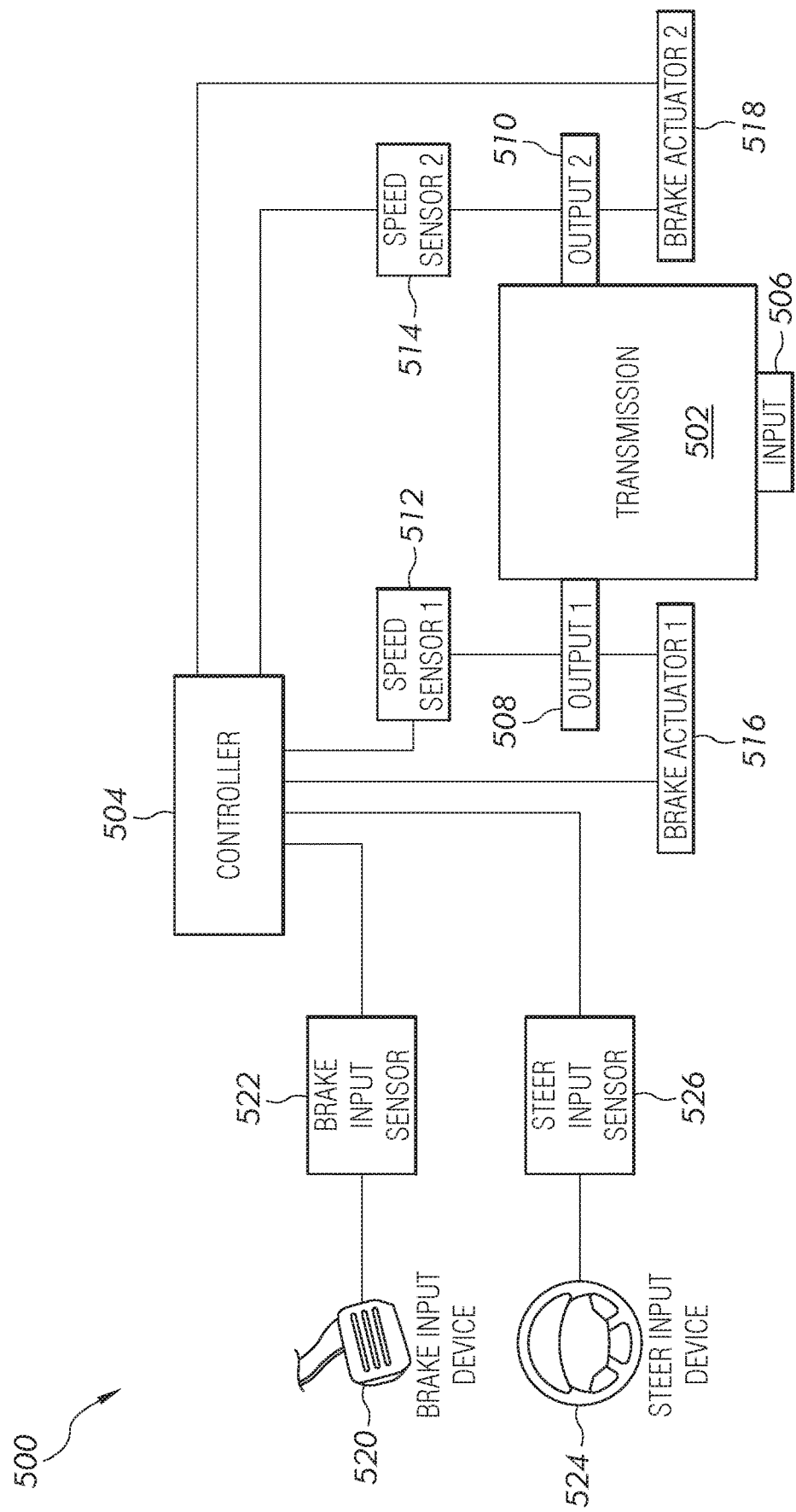
FIG. 5 is a first embodiment of a control system for controlling a transmission system.

A first brake actuator 516 may be coupled to the first output 508 of the transmission 502. The first brake actuator 516 may be an electrohydraulic actuator, an electromechanical actuator, an electric actuator, a mechanical actuator, or any other known type of actuator. The first brake actuator 516 may apply brake pressure to a brake pack, such as one of the brake packs 280 shown in FIG. 2. The brake pack may include a plurality of plates, e.g., a combination of friction and reactionary plates. Any type of brake or brake pack may be suitable for this disclosure. As shown in FIG. 5, the first brake actuator 516 may be controlled by the controller 504. The same may be true of a second brake actuator 518 which applies brake pressure to a second brake pack on the second output 510. The second brake actuator 518 may be similar to the first brake actuator 516, but this is not a requirement of this disclosure. The controller 504 may operably send a current to control the first and second brake actuators to operate the braking system of a vehicle.

The control system 500 further includes a brake input device 520 and a steer input device 524. The brake input device 520 may include a pedal, lever, button, switch, knob, or any other type of known brake input. In some embodiments, the brake input device 520 may include two or more devices. As shown, the brake input device 520 may be in communication with the controller 504. In other words, when an operator applies the brake input device 520, a signal may be communicated to the controller 504 indicative of the operator's command. The signal may be a current that is proportional to the type of command being sent by the operator. Thus, a quick and hard application of the brake input device 520 to induce a quick or sudden stoppage of the vehicle may be communicated and interpreted differently from a light tap or application of the brake input device 520. A brake input sensor 522 may be disposed in electrical communication with the controller 504 for communicating the operator's command thereto. The sensor 522 may be a potentiometer, a load cell, a pressure transducer, a position sensor, a force-detecting sensor, or any known type of sensing device.

Similarly, the steer input device 524 may be a steering wheel, lever, joystick, switch, knob, or other known type of device to command a steer direction or response. A steering wheel or yoke may indicate a steer direction from the operator, and a steer input sensor 526 may detect movement or position of the steer input device 524. As such, the steer input sensor 526 can communicate an operator's steer response command to the controller 504. The steer sensor 526 may be a position sensor, a linear rotary position sensor, or any other type of known sensor.

Figure 6:
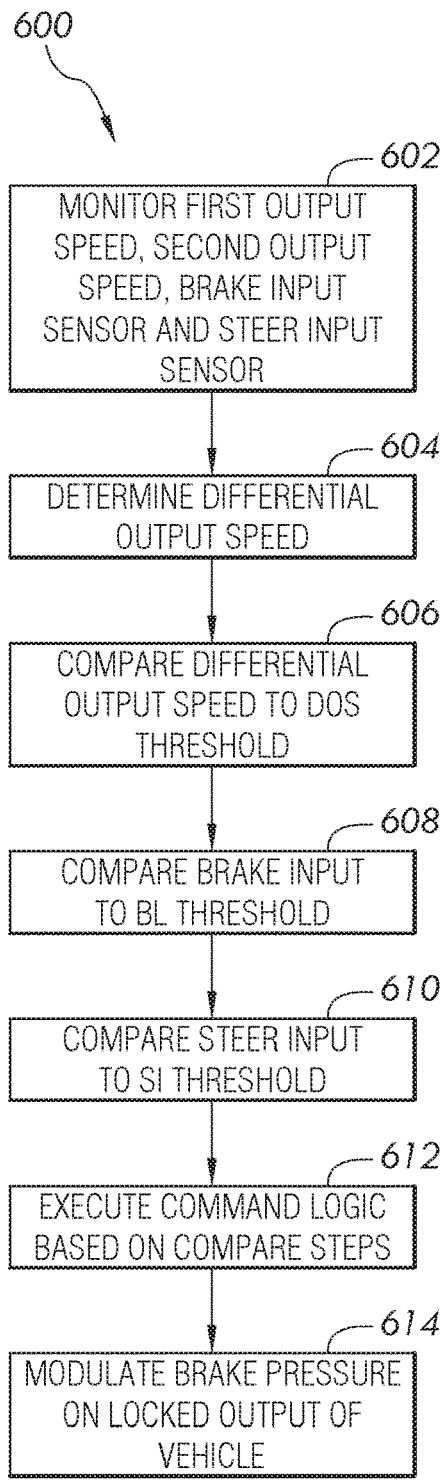
FIG. 6 is a first control process for modulating brake pressure of a brake system.

In the present embodiment, stability control may be achieved when an output of the vehicle is locked or begins to skid, as described above. A control process 600 is shown in FIG. 6. In this process 600, a plurality of blocks or steps may be executed to achieve stability control. For example, in a first block 602, the controller 504 can monitor an output speed of the first output 508 via the first speed sensor 512. The controller 504 may also monitor an output speed of the second output 510 via the second speed sensor 514. In addition to the output speeds, the controller 504 may also monitor the brake input sensor 522 and the steer input sensor 526 to detect any command from the operator.

In addition to monitor the aforementioned sensors, the controller 504 may also determine a differential speed of the two outputs in block 604. The differential output speed determined in block 604 may be compared to a differential output speed (DOS) threshold in block 606. The DOS threshold may be a predefined value stored in the memory of the controller 504. Alternatively, the threshold may be adjustable by the operator, for example. Further, the DOS threshold may be a value defined in the logic or software and calculated or otherwise determined by the controller 504.

As block 602 is executed, the control process 600 may advance to blocks 608 and 610. In block 608, the controller 504 may compare a current brake input command as detected by the brake input sensor 522 to a brake input threshold. The brake input threshold may be stored in the memory of the controller 504. In block 610, the controller 504 may compare a current steer input command as detected by the steer input sensor 526 to a steer input threshold. The steer input threshold may be stored in the memory of the controller 504. Alternatively, the brake input and steer input thresholds may be values defined in the logic or software and calculated or otherwise determined by the controller 504.

During operation, blocks 602-610 may be continuously executed by the controller 504. In block 612, the controller 504 may execute command logic based on the comparison steps of blocks 606, 608, and 610. In this embodiment, the controller 504 executes block 612 if the differential output speed exceeds or satisfies the DOS threshold in block 606, the brake input command exceeds or satisfies the brake input threshold, and the steer input command does not exceed or satisfy the steer input threshold. In other words, as the vehicle 400 is traveling in the travel direction 412 and the operator applies the brakes, in this embodiment one of the two outputs may lock or skid inducing a differential output speed between the two outputs. If the differential output speed, as detected in block 604 exceeds or satisfies the DOS threshold in block 606, the controller 504 further evaluates blocks 608 and 610.

In this example, the operator is applying the brakes and thus the brake input sensor 522 detects this command from the operator and communicates it to the controller 504. The brake input threshold may be set low such that the operator commanding the brakes to engage the outputs results in the brake input command exceeding or satisfying the brake input threshold of block 608. Since the operator is only applying the brakes and not trying to steer the vehicle in this embodiment, the steer input sensor 526 may not detect any steer command from the operator. As such, the controller 504 may infer that the operator does not want to steer the vehicle in any direction other than the current direction of travel 412. Thus, the steer input command may not exceed or satisfy the steer input threshold of block 610.

To provide stability control, the controller 504 may further execute the control process 600 by executing block 614. Here, the controller 504 can modulate or reduce brake pressure on whichever side of the vehicle the output is locked or skidding. The amount or degree to which the brake pressure is modulated or reduce may be determined via an algorithm, a look-up table, chart, graph, or other predefined data stored by the controller 504. Alternatively, the controller 504 may execute a calculation that is a function of the output speed and brake input command to determine how much to modulate brake pressure. With the controller 504 capable of executing the control process 600 of FIG. 6, stability control may be achieved without any operator intervention or control.

In another embodiment of this disclosure, improved steering response may be achieved. Here, a cross-drive transmission is provided with an independently controlled brake actuation on each output and controls provisions to improve steering response during a combined steer and brake apply event. Returning to FIG. 4, the vehicle 400 may be currently traveling in a direction of travel 412 as shown. During operation, the operator may request a steer response to turn the vehicle and a brake response to decelerate the vehicle. In this embodiment, vehicle response can be improved by modulating brake pressure and a biasing force to the desired direction of steer (i.e., the side of the vehicle or machine that has the smallest radius of turn) based on limits or thresholds defined in logic or control software. Steer response, brake pack capacity, vehicle traction limitations and maximum allowable transmission output differential speed are different factors that may be evaluated to achieve improved steering response.

Referring to FIG. 4, if the vehicle is traveling in a straight path as indicated by arrow 412 and the operator requests a steering command to turn the vehicle left (i.e., towards the first side 402), the amount of brake pressure applied to both outputs may be controlled to improve the steer response. For example, when turning left and decelerating, the brake pressure on a first output side of the transmission (i.e., the first output side may operably control the first track 408) may exceed the brake pressure on the other output side thereof (i.e., which may operably control the second track 410). This may be achieved via the control system 500 of FIG. 5 and the control process 700 of FIG. 7.

Figure 7:
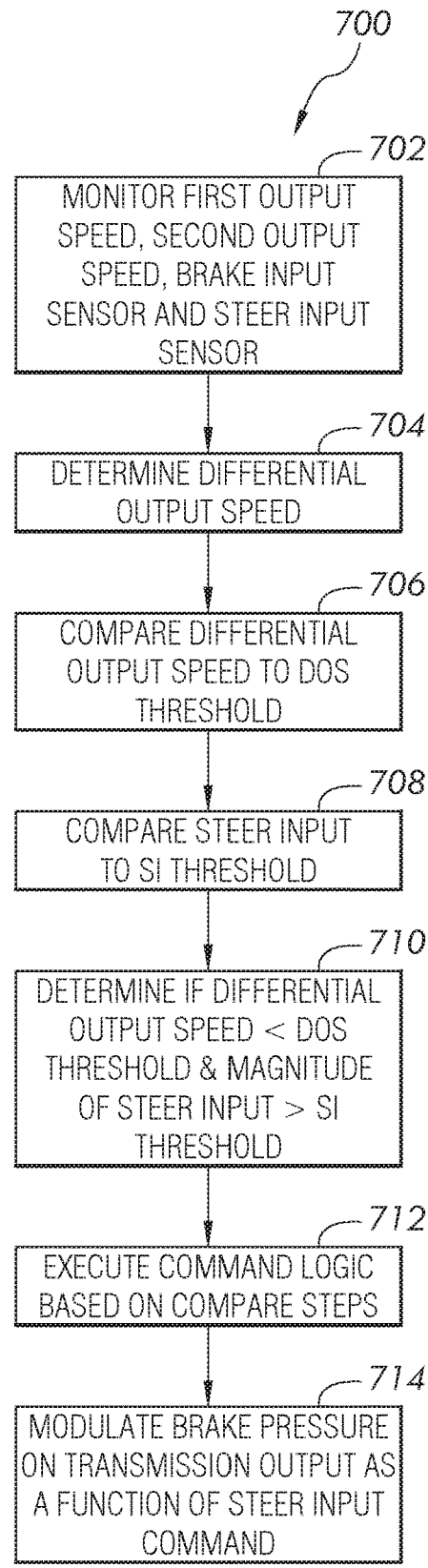
FIG. 7 is a second control process for modulating brake pressure of a brake system.

In the embodiment of FIG. 7, a control process 700 may include a plurality of executable blocks or steps for achieving improved steering response. In this process 700, the controller 504 may execute a first block 702 by monitoring the output speed of the first output 508 via the first speed sensor 512, the output speed of the second output 510 via the second speed sensor 514, brake input command via the brake input sensor 522, and steer input command via the steer input sensor 526. Similar to block 604, the controller 504 may determine a differential output speed of the two outputs in block 704 and compare the differential output speed to the DOS threshold in block 706. The DOS threshold may be the same or different from the DOS threshold referenced above in FIG. 6. In any event, the controller 504 may also compare the steer input command to a steer input threshold in block 708. The controller 504 may repeatedly, periodically or continuously execute blocks 702-708 of the control process 700.

As blocks 700-708 are executed, the control process 700 may advance to block 710 where the controller 504 makes a determination regarding differential output speed and steer input command. Here, the controller 504 determines if the differential output speed is less than the DOS threshold and an absolute value or magnitude of the steer input command exceeds or satisfies the steer input threshold. The magnitude of the steer input command takes into account a direction of the steer input command. For example, if the operator wants to steer in a clockwise direction, the input command may be a positive value. If the operator wants to steer in a counter-clockwise direction, however, the input command may be a negative value. The controller 504 therefore considers the magnitude of the steer input command regardless of direction and compares it to the steer input threshold. If the differential output speed is less than the DOS threshold and the steer input command is greater than the steer input threshold, then the control process 700 may advance to block 712 to execute command logic.

The command logic of block 712 may include referencing a look-up table, graph, chart, formula, or other information. The logic may reference brake actuator command to bias or command a higher brake pressure on the inside track or transmission output as defined by the steer input command detected by the steer input sensor 526. The logic may be a look-up table or formula, for example, that provides brake pressure command as a function of differential output speed, steer input request, and brake request from the operator. In block 714, the controller 504 may command higher pressure to the first brake actuator 516 or the second brake actuator 518 based on the steer input command.

Thus, in this embodiment, the controller 504 may command a higher brake pressure to the first brake actuator 516 compared to the commanded brake pressure to the second brake actuator 518 to assist with a steer command to the first side 502 of the vehicle (e.g., a counterclockwise steer command). Alternatively, the controller 504 may command a higher brake pressure to the second brake actuator 518 compared to the commanded brake pressure to the first brake actuator 516 to assist with a steer command to the second side 404 of the vehicle (e.g., a clockwise steer command). As a result, the controller 504 may utilize the braking system of the vehicle to improve the steer response by modulating brake pressure between the two transmission outputs, and there may be no or little operator intervention in doing so (beside requesting a steer command and brake command).

In a further embodiment of the present disclosure, a cross-drive transmission may be provided with an independently controlled brake actuation on each output and controls provisions to regulate a vehicle pivot radius during a pivot steer request or event. In this embodiment, the vehicle may be stationary and an operator requests a pivot steer command. During a pivot steer maneuver, the first or second track may move in a forward direction and the other track moves in the opposite (i.e., rearward) direction, and each output may be at a different speed. If one output speed is much greater than the other output speed, the vehicle pivots at a larger pivot radius.

In circumstances where the operator desires to minimize the pivot radius within which the vehicle completes or executes a pivot steer maneuver, independent brake actuation can be utilized to regulate the relative output speeds to minimize the pivot radius. In the example of FIG. 4, the output speed of the first track 408 and the output speed of the second track 410 may be operably controlled via brake actuation so that each speed is equal and opposite to achieve the desired pivot steer maneuver with minimal pivot radius.

Figure 8:
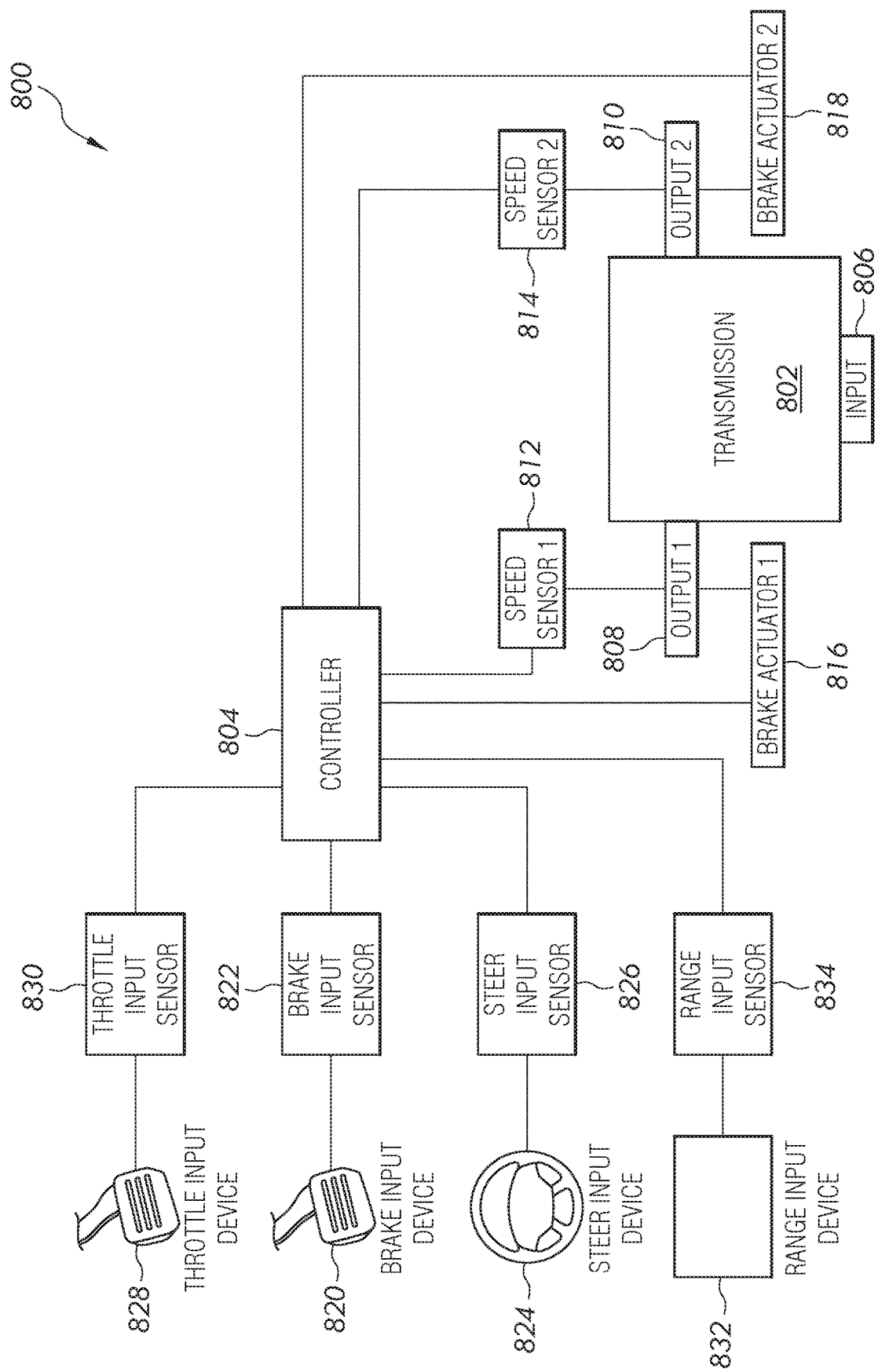
FIG. 8 is a second embodiment of a control system for controlling a transmission system.

To minimize the pivot radius and achieve a true pivot, a control system 800 is provided in FIG. 8. The control system 800 is similar to the control system 500 of FIG. 5. Thus, the description of the control system 500 of FIG. 5 is applicable to the control system 800 of FIG. 8. In this embodiment, the control system 800 includes a cross-drive transmission 802 that may be controlled by a controller 804. The transmission 802 may include one or more inputs 806 and at least a first output 808 and a second output 810. A first speed sensor 812 may detect a rotational output speed of the first output 808, and a first brake actuator 816 may be used to control the output speed of the first output 808. Similarly, a second speed sensor 814 may detect a rotational output speed of the second output 810, and a second brake actuator 818 may be used to control the output speed of the second output 810. Each speed sensor may be in communication with the controller 804, and each brake actuator may be operably controlled by the controller 804.

Similar to the control system 500 of FIG. 5, the control system 800 in FIG. 8 may also include a brake input device 820 and a steer input device 824. The brake input device 820 may be actuated by the operator to send a brake input request, and the steer input device 824 may be actuated by the operator to send a steer input request. A brake input sensor 822 may detect a request via the brake input device 820 and communicate the request to the controller 804. Similarly, a steer input sensor 826 may detect a request from the steer input device 824 and communicate the request to the controller 804.

As also shown in FIG. 8, the control system 800 may include a throttle input device 828. The throttle input device 828 may be a pedal, a lever, knob, switch, joystick, a hand or foot operated device, a voice-recognition device, or any other known device for requesting a throttle command. Actuation of the throttle input device 828 may be detected by a throttle input sensor 830, which is in communication with the controller 804.

A range input device 832 may also be included in the control system 800. The range input device 832 may include a shift selector similar to the one shown in FIG. 3. The range input device 832 may be actuated by the vehicle operator to control the transmission into a forward range, a reverse range, neutral, pivot, park, etc. There may be multiple forward ranges or reverse ranges which the operator may select via the range input device 832. In any event, actuation of the range input device 832 may be detected by a range input sensor 834, as shown in FIG. 8. The range input sensor 834 may be in communication with the controller 804 to send an operator request thereto.

Figure 9:
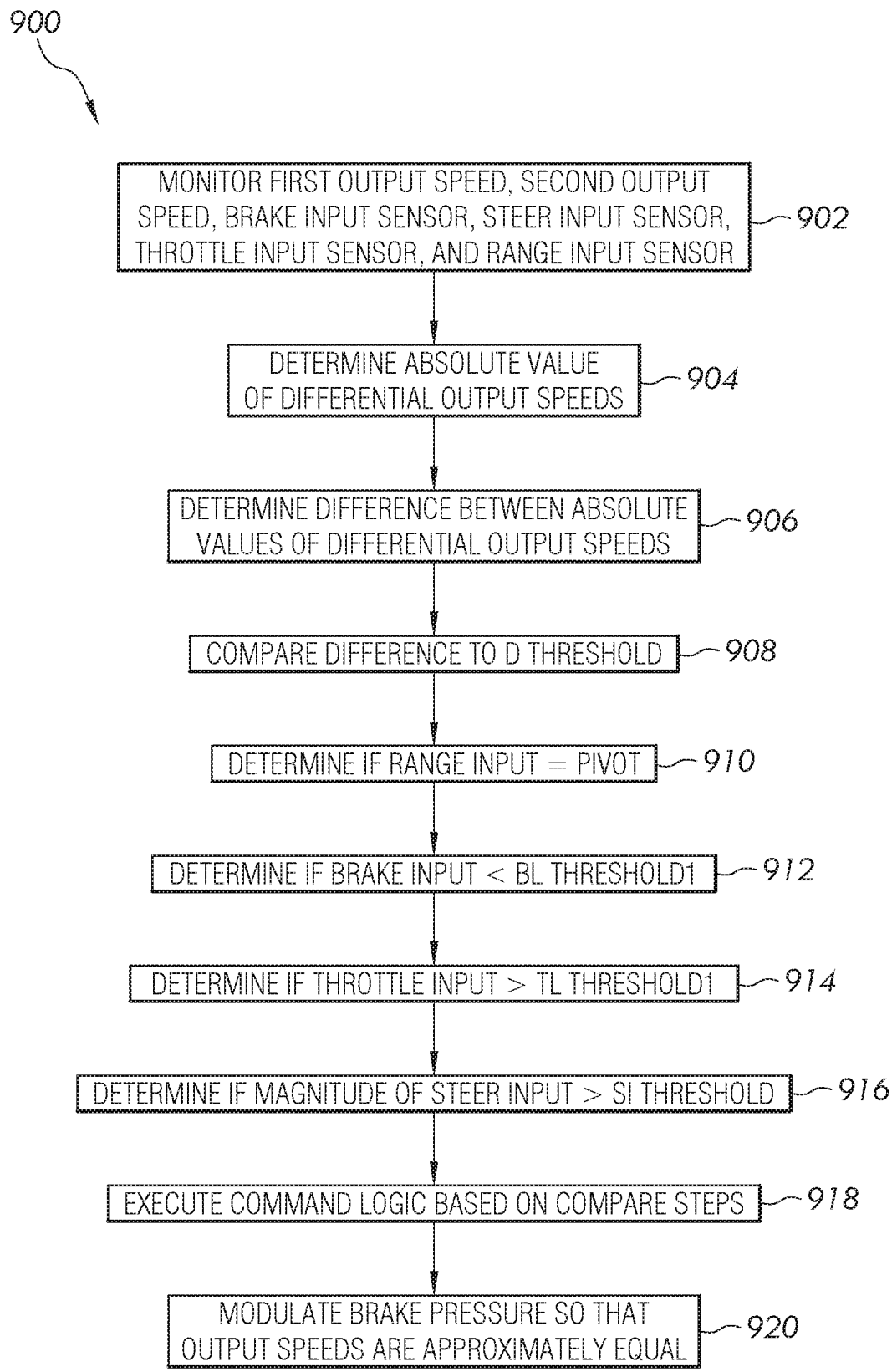
FIG. 9 is a control process for modulating brake pressure to affect a steering response of a vehicle.

Referring to FIG. 9, a control process 900 may be provided to control equal and opposite speeds at both outputs of the transmission 802 during a pivot steer operation. The control process 900 may include a plurality of blocks or steps which are executable by the controller 804. In this process 900, the controller 804 may execute a first block 902 by monitoring the output speed of the first output 808 via the first speed sensor 812, the output speed of the second output 810 via the second speed sensor 814, brake input command via the brake input sensor 822, steer input command via the steer input sensor 826, throttle input command via the throttle input sensor 830, and range input command via the range input sensor 834.

As block 902 is being executed, the control process 900 advances to block 904 in which the controller 804 determines an absolute value or magnitude of each output speed. As previously described, in a pivot steer operation, the first output 808 and the second output 810 rotate in the opposite directions and thus one output speed may be detected as a positive speed and the other output speed may be detected as a negative speed. In one example, whichever output rotates in the forward direction may be detected as having a positive output speed, whereas the output that rotates in the reverse direction may be detected as having a negative output speed. In any event, the controller 804 determines the magnitude of each output speed in block 904, and then determines a difference between the output speeds in block 906.

Once block 906 is executed, the control process 900 may advance to block 908 where the controller 804 compares the difference in output speeds from block 906 to a threshold value. In addition, the controller 908 may detect if the range input command corresponds to the pivot position in block 910, if the brake input command is less than a brake input threshold in block 912, and if a throttle input command is greater than a throttle input threshold in block 914. Moreover, in block 916, the controller 804 may determine if the steer input command is greater than a steer input threshold. In one embodiment, the controller 804 may first determine a magnitude of the steer input command and then compare the magnitude of the command to the steer input threshold. This may be the case, for example, when a clockwise steer command is considered a positive input and a counterclockwise steer command is considered a negative input.

Based on the results of blocks 908-916, the control process 900 may advance to block 918 where the controller 804 may execute command logic for the pivot steer operation. This again happens when the controller 804 determines there is a difference between the output speeds in block 908, the operator has commanded the transmission 802 to its pivot range in block 910, the operator is not applying the brakes in block 912, the operator is applying throttle to make the pivot in block 914, and the operator has commanded a steer request in block 916. In some embodiments, block 914 may be an optional step where no throttle input is required to complete the pivot steer operation as commanded by the operator. In the embodiment of FIG. 9, the throttle input threshold may be set relatively low at about 10-20% based on vehicle response, and in particular, the type of engine or engine response. Alternatively, the throttle input threshold may be set to less than 45% in another embodiment. Moreover, the threshold may be set to less than 10% in a further embodiment. When throttle input command is detected and compared to a threshold as in block 914, the throttle input threshold may be set to a value indicative that the operator desires enough throttle to complete the pivot steer operation.

As the controller 804 executes block 918, brake pressure may be modulated at the first output 808 and second output 810 until the output speed at both outputs is approximately the same. As the output speeds are approximately equal, the pivot radius may be reduced or minimized as the vehicle performs the pivot steer operation. In one aspect, the controller 804 may include a look-up table or execute an algorithm or calculation that takes into account the steer input command, throttle input command, and output speeds to determine the desired pivot steer radius. In most instances, the desired pivot steer radius is equal to or approximately zero. The controller 804 can modulate the brake pressures accordingly so that the desired radius may be achieved. In this manner, the controller 804 automatically makes a number of determinations and decisions without any operator intervention. Thus, the control 900 may be executed to regulate or reduce the pivot steer radius by utilizing the braking system of the vehicle in addition to its steering system.

In yet a further embodiment of the present disclosure, a cross-drive transmission may be provided with an independently controlled brake actuation on each output and controls provisions to effect a vehicle steering operation if the primary steer system of the vehicle does not achieve the commanded response. In other words, if the vehicle operator commands a steer operation but the steer system does not respond, independent brake actuation can be utilized to regulate the relative speed of the vehicle tracks (i.e., first track 408 and second track 410) and thus effect or assist with a steer operation or maneuver.

In the example of the illustrated embodiment of FIG. 4, the vehicle operator may request a steer command in the clockwise or right-hand direction. However, if something breaks in the steering system or there is some other problem that effects the primary steer system of the vehicle from executing the desired steer command, brake actuation can be used to assist the steer system. This may also be used in case of a stalled engine or a failure with the engine or HSU 240 of FIG. 2B. In any event, vehicle track speeds may be monitored and if the speeds do not correspond to commanded track speeds to complete the steer request, the brake on the second side 404 of the vehicle may applied to help steer the vehicle in the clockwise direction. This is further described with reference to FIGS. 10 and 11.

Figure 10:
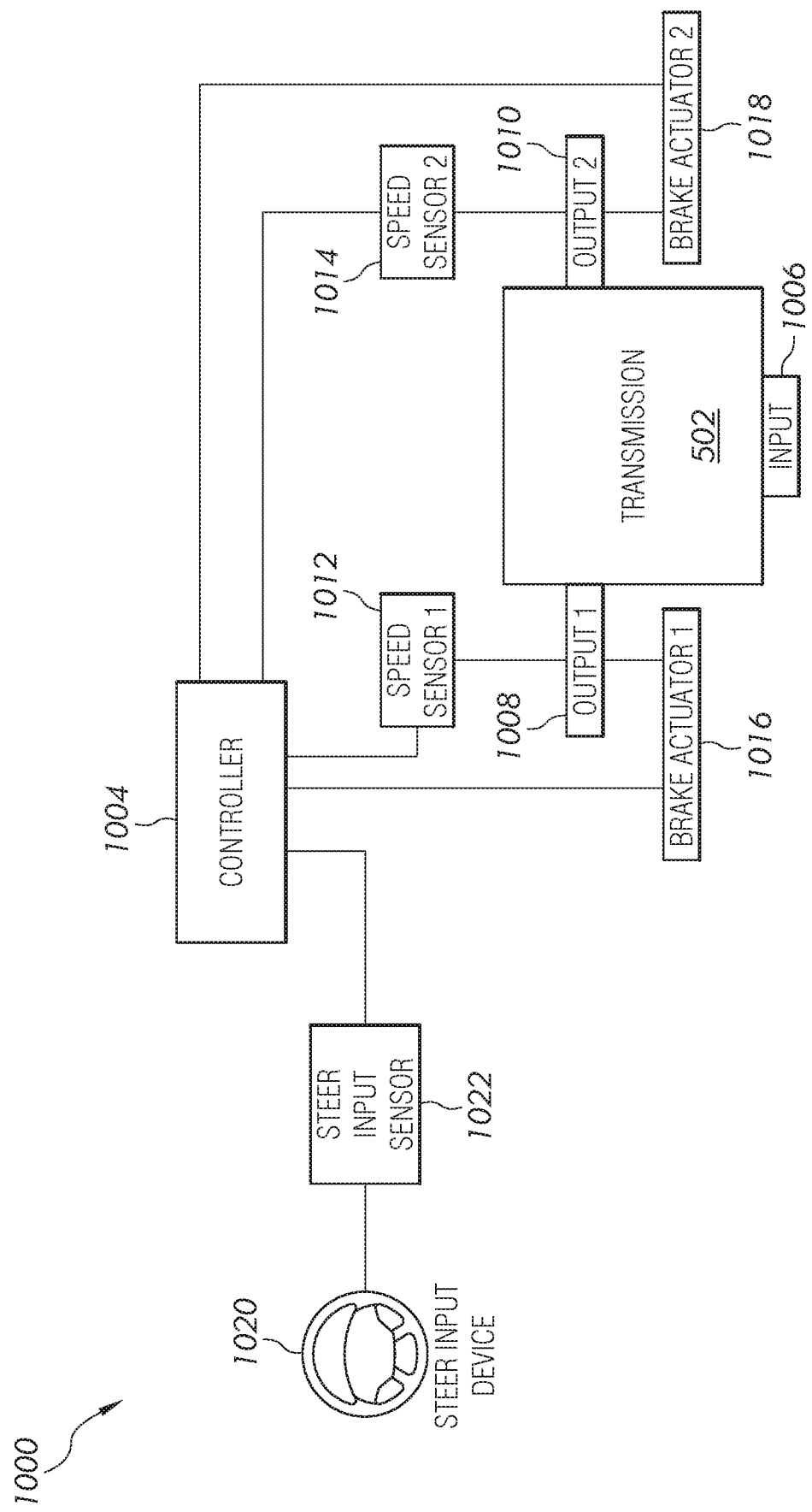
FIG. 10 is a third embodiment of a control system for controlling a transmission system.

Referring to FIG. 10, a control system 1000 may include a controller 1004 for controlling a cross-drive transmission 1002 is provided. The controller 1004 may include a memory and a processor. Logic, algorithms, look-up tables, charts, graphs, and other electronic instructions may be stored in the memory of the controller 1004 for executing various commands to control the transmission 1002, steering and braking of the vehicle.

The transmission 1002 may include a plurality of inputs 1006 and at least a first output 1008 and a second output 1010. The first output 1008 may drive the first track 408 and the second output 1010 may drive the second track 410 of the illustrated vehicle 400 of FIG. 4. A first speed sensor or sensing device 1012 may detect rotational output speed of the first output 1008, and a second speed sensor or sensing device 1014 may detect rotational output speed of the second output 1010. As shown, the first and second speed sensors may be in electrical communication with the controller 1004 to communicate the rotational speed of each output to the controller 1004.

A first brake actuator 1016 may be coupled to the first output 1008 of the transmission 1002. The first brake actuator 1016 may be an electrohydraulic actuator, an electromechanical actuator, an electric actuator, a mechanical actuator, or any other known type of actuator. The first brake actuator 1016 may apply brake pressure to a brake pack, such as one of the brake packs 280 shown in FIG. 2. Any type of brake or brake pack may be suitable for this disclosure. As shown in FIG. 10, the first brake actuator 1016 may be controlled by the controller 1004. The same may be true of a second brake actuator 1018 which applies brake pressure to a second brake pack on the second output 1010. The second brake actuator 1018 may be similar to the first brake actuator 1016, but this is not a requirement of this disclosure. The controller 1004 may operably send a current to control the first and second brake actuators to operate the braking system of a vehicle.

The control system 1000 further includes a steer input device 1020. The steer input device 1020 may be a steering wheel, lever, joystick, switch, knob, or other known type of device to request a steer direction or response. A steering wheel or yoke may indicate a steer direction from the operator, and a steer input sensor 1022 may detect movement or position of the steer input device 1020. As such, the steer input sensor 1022 can communicate an operator's steer request to the controller 1004. The steer input sensor 1022 may be a position sensor, a linear rotary position sensor, or any other type of known sensor.

Figure 11:
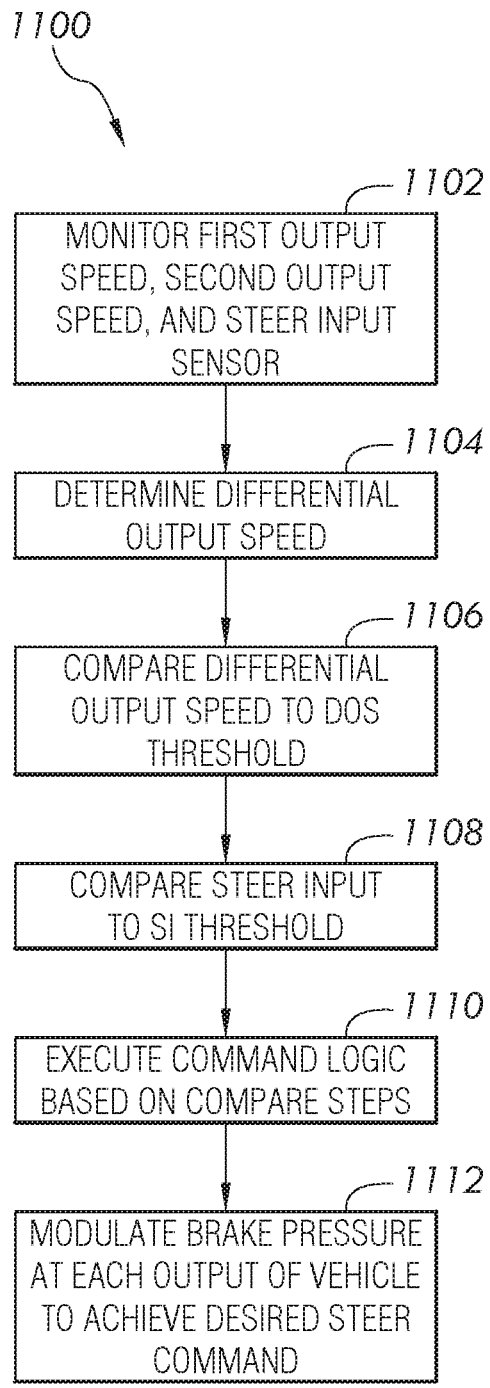
FIG. 11 is a control process for modulating brake pressure of a brake system to achieve a desired steer response.

In FIG. 11, a control process 1100 is provided to assist with steering a vehicle in the event the steering system is unable to complete an operator's steer request or there is some other problem with the vehicle that inhibits the steer request from being completed. During normal vehicle operation, the controller 1004 can monitor various vehicle characteristics including vehicle speed and range. From the control system 1000 of FIG. 10, the controller 1004 is also able to monitor or detect output speed at the first output 1008 and the second output 1010 and steer input via the steer input device 1020. As described in other embodiment of this disclosure, the controller 1004 may be in communication with a brake input device. When requesting a steer input, however, the operator may not be requesting any brake input. If the steering system is unable to complete the steer input request, the controller 1004 may utilize the braking system to complete the steer request.

From the vehicle speed, range, and steer input, the controller 1004 may be able to interpret or determine how sharp of a turn the vehicle should make depending upon differential speed ratio. This may be stored or computed by the controller 1004 from a look-up table, graph, chart, formula, etc. When executing the control process 1100, a plurality of blocks or steps may be executed by the controller 1004 to control the braking system to achieve a steering operation. In a first block 1102, the controller 1004 may first monitor or detect output speeds at the first output 1008 and second output 1010 and also a steer input request from the steer input device 1020. The steer input request may include a command to turn the vehicle in a clockwise or counterclockwise direction. In some cases, the controller 1004 may receive either a positive or negative value for the steer input request, where the value is indicative of the requested direction. Block 1102 may be continuously executed by the controller 1004 as it receives inputs from the speed sensors and steer input sensor 1022.

As block 1102 is executed, the control process 1100 may advance to block 1104 in which the controller 1004 determines a differential output speed, i.e., a difference between the output speeds of the first output 1008 and the second output 1010. In block 1106, the controller 1004 compares the differential output speed from block 1104 to a differential output speed (DOS) threshold. In block 1108, the controller 1004 compares the requested steer input request to a steer input threshold. Based on the comparisons of blocks 1106 and 1108, the control process 1100 may advance to block 1110 where the controller 1004 executes command logic to assist with the steer input command. In this block, the controller 1004 may determine if the differential output speed exceeds the DOS threshold. To complete a clockwise steering operation, the output speed of the second output 1010 may need to be less than the output speed of the first output 1008 by a defined margin. In other words, the differential output speed may need to exceed the DOS threshold to complete the steering operation, or the steering operation may not be completed.

If it is determined that the differential output speed does not exceed the DOS threshold, and the controller 1004 further determines that the operator is attempting to steer the vehicle by detecting the steer input command from the steer input device 1020 (i.e., via the steer input command exceeding the steer input threshold in block 1108), the control process 1100 may advance to block 1112. In block 1112, the controller 1004 can modulate or control brake pressure at each output of the vehicle to achieve the desired steer command. Here, the controller 1004 may utilize a look-up table, chart, graph, calculation or other known means to determine how much brake pressure to command each output. In some instances, the controller 1004 may only command brake pressure to one output. A look-up table, for example, may be stored in a memory unit of the controller 1004 and structured to include brake pressure, steer input command, differential output speed, and any other variables for determining how much to brake either output. From these variables, the controller 1004 may determine how sharp of a turn is required for steering the vehicle based on the operator's intent (i.e., operator's desired steer radius). In vehicles that include both a service brake and a parking brake, the controller 1004 may further execute a block or step to actuate either brake. Similar to the previous embodiments, however, the brake actuation may be achieved automatically without operator intervention.

In a further embodiment, a control system similar to the one in FIG. 5 may include a brake input device 520, a brake input sensor 522, a steer input device 524, and a steer input sensor 526. During operation, the controller 504 may detect that an operator is inputting a full command to the brake input device 520 and a full command to the steer input device 524. In other words, the operator may be fully applying the brake input device 520 and attempting a hard turn on the steer input device 524. In this embodiment, the controller 504 may be programmed to utilize an algorithm, a look-up table, chart, graph, calculation or other known means to detect the desired operator response. One possible response may be to ignore the steer command and actuate the brake actuators 516, 518 to slow the vehicle. In this response, the controller 504 may detect an error in the steer system.

In an alternative response, the controller 504 may actuate the brake actuators 516, 518 to slow and steer the vehicle based on both commands. In this example, the controller 504 may or may not command the vehicle steer system to act, but rather control steering and braking via the brake actuators. The controller 504 may also detect an issue with the brake system, and either allow for the steering command while ignoring the brake command, or more likely control the vehicle according to both the braking and steering commands. In doing so, the controller 504 may control the vehicle to a safe speed in the event there is a detected problem with either the braking or steer systems. Further algorithms or status checks may be completed by the controller 504 to ensure both systems are operating properly.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of controlling a vehicle moving in a direction of travel during a braking Operation, comprising:
   providing a first brake actuator, a second brake actuator, a brake input device, a steer input device, and a cross-drive transmission including a first output and a second output;
   detecting a first output speed at the first output and a second output speed at the second output;
   receiving a brake input request and a steer input request, the brake input request received from the brake input device and the steer input request received from the steer input device;
   determining a differential output speed based on the first output speed and the second output speed;
   comparing the differential output speed to a first threshold, the brake input request to a second threshold, and the steer input request to a third threshold;
   determining based on the comparing step whether the first output or the second output is locked during the braking operation;
   controlling the first brake actuator or the second brake actuator based on which output is determined to be locked; and
   controlling the vehicle during the braking operation.

2. The method of claim 1, further comprising reducing a brake pressure applied to whichever of the first or second output is determined to be locked.

3. The method of claim 2, further comprising discontinuing the reducing step once the locked output is unlocked.

4. The method of claim 1, further comprising executing the controlling steps if:
   the differential output speed is greater than the first threshold;
   the brake input request is greater than the second threshold; and
   the steer input request is less than the third threshold.

5. The method of claim 1, further comprising Maintaining movement of the vehicle along the direction of travel during the braking operation.

6. The method of claim 1, further comprising reducing a rotational movement of the vehicle relative to the direction of travel.

7. The method of claim 1, further comprising:
   providing a first speed sensor, a second speed sensor, a brake input sensor, and a steer input sensor; and
   detecting the first output speed with the first speed sensor, the second output speed with the second speed sensor, the brake input request with the brake input sensor, and the steer input request with the steer input sensor.

8. The method of claim 1, further comprising:
   providing a controller for operably controlling the transmission;
   storing a look-up table in the controller; and
   executing command logic based on the look-up table to actuate the first brake actuator or the second brake actuator based on Which output is determined to be locked.

* * * * *